March 3, 1953     L. R. PETERS     2,630,471
QUARTZ-TO-METAL SEAL
Filed June 19, 1951
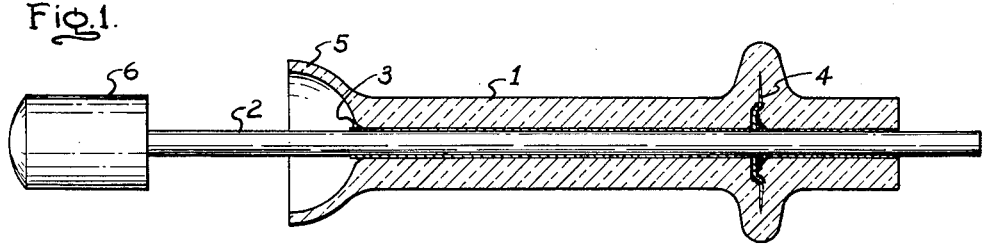
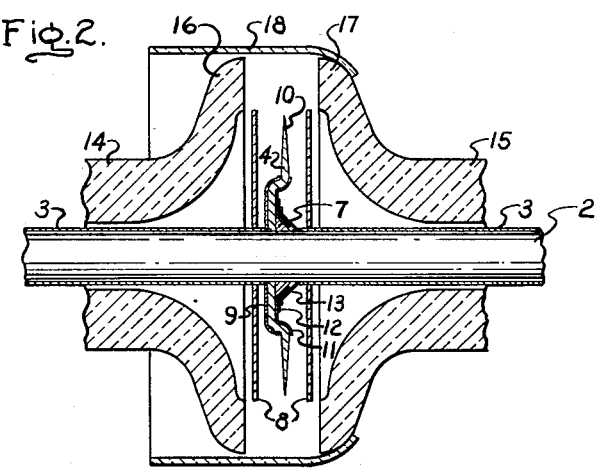
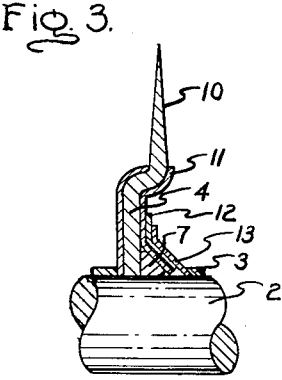
Inventor:
Leo R. Peters,
by Vernut C. Kauffman
His Attorney.

Patented Mar. 3, 1953

2,630,471

UNITED STATES PATENT OFFICE 2,630,471

QUARTZ-TO-METAL SEAL

Leo R. Peters, Cleveland Heights, Ohio, assignor to General Electric Company, a corporation of New York Application June 19, 1951, Serial No. 232,332

4 Claims. (Cl. 174—50.63)

My invention relates to quartz-to-metal seals for electric devices, such as electric discharge lamps.

In my copending application Serial No. 24,522 filed May 1, 1948 I have described a quartz-to-metal seal of high capacity and of small size and simple structure using but one large conductor, such as a tungsten rod, for carrying the current and passing through the quartz part of the seal. The quartz is not fused to the rod; rather, a seal member in the form of a thin molybdenum disc around the rod and hermetically united therewith is provided. The disc has a thin feathered peripheral edge imbedded in the quartz and to which the quartz is fused to make a gas tight joint. The hermetic joint between the molybdenum disc and the tungsten rod is constituted by an alloy of these two metals and platinum.

As disclosed in my copending application such seals are made in the form of stems for the quartz envelopes of high pressure mercury vapor discharge lamps having a power consumption of the order of kilowatts and a vapor pressure of many atmospheres.

An object of the present invention is to provide a seal of the above type wherein discs of greater thickness may be hermetically united with the quartz to increase the strength of the stem without increasing the risk of fracture of the seal or of the stem. Another object of the invention is to provide a method of making such a seal. Still further objects and advantages attaching to the invention and to its use and operation will be apparent from the following detailed description of species thereof.

In the accompanying drawing an embodiment of the invention is shown in which Fig. 1 is an elevational, partly sectional view of a stem having a seal structure embodying my invention; Fig. 2 is a fragmentary partly sectional view on an enlarged scale of the assembled seal portion of the stem and Fig. 3 is a similar view of one half of the disc assembly of the stem.

Referring to Fig. 1 the stem comprises a quartz stem tube 1 having a conductor rod 2 extending therethrough. Thin molybdenum foil sleeves 3, the thickness of which is exaggerated in the drawing, are wrapped around the rod 2 to prevent the quartz fusing with and adhering to the rod during fabrication of the stem. A molybdenum disc 4 is positioned around the rod 2 and its thin tapered peripheral sealing edge is imbedded in the vitreous wall of the stem to make a gas tight joint. The disc 4 is cup shaped to relieve the radial strains set up therein because of the different rates of expansion of the rod 2, the disc 4 and the vitreous part of the stem under manufacturing and service conditions.

The stem tube 1 is provided with a flare 5 at one end thereof for fusion with the sides of an opening in a quartz envelope to close said opening with the electrode 6 mounted on rod 2 within the envelope. When the envelope is that of an electric discharge lamp operating at an elevated temperature, the joint between the disc 4 and the rod 2 must be gas tight at temperatures ranging from room temperature to perhaps hundreds of degrees centigrade. As disclosed in my copending application referred to above I have found that a brazed platinum joint meets these requirements and is mechanically strong enough to withstand pressures of many atmospheres at such temperatures. The brazed joint is shown at 7 in Fig. 2 of the drawing and is on the side of the disc 4 away from the flare 5.

In order to minimize mechanical strain between the peripheral edge of the disc 4 and the quartz portion of the stem I interpose between and hermetically unite with these members during manufacture of the stem vitreous material having a coefficient of expansion between that of quartz and that of molybdenum. The disc 4 may then be of greater thickness and greater mechanical strength to increase the strength of the stem. As shown in Fig. 2 of the drawing, this vitreous material is in the form of a pair of annular wafers 8 which are mounted around the rod 2 in opposing positions with respect to disc 4 during assembly of the stem. The wafers 8 are of larger outside diameter than the disc 4 so that the latter is completely covered thereby in the completed stem.

The assembly including the foil covered rod 2, the disc 4 hermetically united therewith by the brazed joint 7, and the wafers 8 positioned as shown in Fig. 2, also includes a molybdenum foil covering for the joint 7 and the thicker, cup shaped portion of the disc 4 to prevent the wafers 8 sticking to these thick metal portions during manufacture of the stem just as the foil 3 prevents the quartz portion of the stem sticking to the rod 2 to avoid fracture of the stem.

The foil covering for the side of the disc 4 facing toward the flare 5 is a single annular sheet or washer 9 (Figs. 2 and 3) extending from the rod 2 outwardly to the inner edge of the tapered portion 10 of the disc 4. The foil covering for the side of disc 4 facing away from flare 5 and the brazed joint 7 is made up of a number of annular, overlapping sheets or washers (Figs. 2 and 3) to provide a greater cushioning action between the joint 7 and the cup shaped portion of disc 4 on one hand and the opposed wafer 8 on the other. The first of the said sheets, sheet 11, extends from adjacent the rod 2 to the end of the tapered edge 10 of the disc 4 so as to cover the inner surface of the cup shaped portion of the disc 4 and part of the joint 7. The intermediate annular sheet 12 overlays the inner portion of the sheet 11 and terminates on the bottom of the cup shaped portion of disc 4. The annular sheet 13 extends from the rod 2 partially over the sheet 12 and terminates short of the peripheral edge of the latter.

In making the stem the above described assembly of the metal parts thereof with the wafers 8 is mounted within a pair of flared quartz tubes 14 and 15 by inserting the ends of the foil covered rod 2 in the bores of the tubes 14 and 15. The flares 16 and 17 of the tubes 14 and 15, respectively, are of larger diameter than the disc 4 and the wafers 8 and one of them, flare 17, has united therewith a quartz cylindrical ring member 18 slightly larger in diameter than the flares and extending a sufficient distance from flare 17 to cover the gap between the flares 16 and 17 and to overlap the periphery of the flare 16 when the elements making up the stem are assembled as shown in Fig. 2.

With the stem components assembled as shown in Fig. 2 an inert gaseous atmosphere, such as nitrogen, is caused to flow inward from the outer ends of the quartz tubes 14 and 15 to free the interior of the assembly from air and fill it with inert gas. The quartz ring 18 is then heated by the usual gas flame to collapse it onto and join it with flare 16 while a gentle flow of the inert gas is continued to exclude from the interior of the assembly contaminating gases from the flame. The flame is deflected by the ring 18 away from the surfaces of the ring 18 and the flare 16 to be united.

After ring 18 and flare 16 have thus been hermetically united the flow of inert gas is discontinued, the interior of the assembly is evacuated and the flares 16 and 17 are heated to their softening temperature. During heating of the flares 16 and 17 the wafers 8 are also heated by heat from the flame transmitted thereto through the ring 18 and flares 16 and 17. The wafers 8 are of a selected vitreous material having a softening temperature about 200° C. less than that of quartz so that when the flares 16 and 17 have been softened sufficiently to unite with each other the wafers 8 are soft enough to unite with the peripheral edge portion 10 of the disc 4 to make a gas-tight joint therewith.

When the quartz flares 16 and 17 and the wafers 8 have been heated to their softening temperature as described above the tubes 14 and 15 are moved toward each other along the rod 2 to force the flares 16 and 17 against the wafers 8 and the latter against the sealing edge portion 10 of the disc 4 to hermetically unite these members together. The peripheral portions of the flares 16 and 17 extending beyond the wafers 8 are also joined to each other during this step in the method.

The heating is continued and the heating flame is directed so as to collapse first the portions of flares 16 and 17 opposite the foiled covered portions of the disc 4 and the joint 7 and then the body of tubes 14 and 15 is collapsed onto the foil covering 3 of rod 2. This increases the mechanical strength of the stem. The flame is then removed from the stem, the vacuum pump is disconnected therefrom and the stem is allowed to cool. The electrode 6 may then be mounted on the rod 2, as by welding, to complete the stem assembly.

In a stem having the construction described above and made by me the molybdenum disc 4 was ¾ inch in outer diameter and .005 inch thick at its cup shaped portion which was .02 inch deep and $\frac{7}{16}$ inch in diameter. The peripheral or sealing edge portion 10 of disc 4 was etched to a thickness of .002 inch at a distance of 1 mm. from its outer end and to a thickness of .004 inch adjacent the rim of the cup shaped portion. The annular sheets 9, 11, 12 and 13 and the foil sleeves 3 were .0007 inch thick. The sheet 12 overlaying the inner portion of sheet 11 was $\frac{5}{16}$ inch in outer diameter and the sheet 13 was ¼ inch in outer diameter. The rod 2 was ⅛ inch in diameter and the wafers 8 were approximately .04 inch in thickness. I have demonstrated that discs having a thickness of .007 inch at the cup portion and .005 inch at the heaviest portion of the sealing edge in contact with the wafers 8 may be successfully used in the new stem. In contrast, when the wafers 8 are omitted the thickness of the sealing edge portion of the disc united with the quartz cannot exceed .0025 inch.

While vitreous material of many different compositions having suitable softening temperatures and coefficients of expansion may be used for wafers 8, I prefer the material designated in the trade as 7911 "Vycor" which has approximately twice the thermal coefficient of expansion of quartz, a softening point more than 200° C. less than quartz and which contains 96% silica by weight. When desired, the rod 2 may consist of molybdenum or of a mixture of tungsten and molybdenum, and the disc 4 may consist of tungsten or a mixture of tungsten and molybdenum with appropriate modification of the dimensions of the disc.

What I claim as new and desire to secure by Letters Patent of the United States is:

1. A stem for a high pressure mercury vapor discharge lamp comprising a quartz stem tube, a refractory metal sealing disc within said tube and hermetically united around said conductor, said disc having a tapered sealing edge, said stem comprising also a vitreous material interposed between said disc and said quartz stem tube and hermetically united with said tube and with the tapered edge of said disc, said material having a coefficient of expansion between that of said disc and that of quartz and a softening temperature of the order of 200 degrees centigrade less than that of the quartz, the maximum thickness of the said tapered sealing edge of said disc united with said vitreous material substantially exceeding the maximum permissible thickness of the corresponding portion of a similar disc having its sealing edge hermetically united directly with quartz.

2. A stem for a high pressure mercury vapor discharge lamp comprising a quartz stem tube, a refractory metal conductor extending through said tube and a refractory metal sealing disc within said tube and hermetically united around said conductor, said disc being cup shaped at its center portion and having a tapered peripheral sealing edge, a refractory metal foil sheet covering the outer surface of said cup shaped disc portion and a plurality of similar overlapping sheets of decreasing diameter covering the inner surface of said cup shaped portion, said stem comprising also a vitreous material interposed between said disc and said quartz stem tube, said material being hermetically united with said stem tube and to the peripheral portion of said disc and having a coefficient of expansion between that of said disc and that of quartz and a softening temperature of the order of 200 degrees centigrade less than that of the quartz, the maximum thickness of the said tapered sealing edge of said disc united with said vitreous material substantially exceeding the maximum permissible thickness of the corresponding portion of a similar disc having its sealing edge hermetically united directly with quartz.

3. The method of making a quartz-to-metal seal of the type having a quartz stem tube, a refractory metal conductor extending through said tube and a refractory metal sealing disc within said tube and hermetically united around said conductor which comprises the steps of mounting on the conductor and in opposed positions with respect to the disc a pair of annular wafers of vitreous material having a lower softening temperature than quartz and a coefficient of expansion between that of quartz and that of the refractory metal of the disc, mounting the ends of the conductor in quartz tubes having flared inner ends so that the peripheries of said flared tube ends, said wafers and said disc are juxtaposed, heating the peripheries of said flares to the softening temperature of quartz while maintaining a non-oxidizing atmosphere about said disc and moving said flares together to hermetically unite said flares to each other and to said wafers and to hermetically unite said wafers to said disc.

4. The method of making a quartz-to-metal seal of the type having a quartz stem tube, a refractory metal conductor extending through said tube and a refractory metal sealing disc within said tube and hermetically united around said conductor which comprises the steps of covering said rod and the center portion of said disc with molybdenum foil to prevent the vitreous components of the stem sticking to said rod and said disc, mounting on the conductor and in opposed postions with respect to the disc a pair of annular wafers of vitreous material having a lower softening temperature than quartz and a coefficient of expansion between that of quartz and that of the refractory metal of the disc, mounting the ends of the conductor in quartz tubes having flared inner ends so that the peripheries of said flared tube ends, said wafers and said disc are juxtaposed, heating the peripheries of said flares to the softening temperature of quartz while maintaining a non-oxidizing atmosphere about said disc and moving said flares together to hermetically unite said flares to each other and to said wafers and to hermetically unite said wafers with said disc and then heating and collapsing said quartz about the foil covered portions of said disc and said rod to make a mechanical joint therewith strengthening said stem.

LEO R. PETERS.

REFERENCES CITED

The following references are of record in the file of this patent:

UNITED STATES PATENTS

| Number | Name | Date |
| --- | --- | --- |
| 2,054,521 | Greiner | Apr. 18, 1950 |